Oct. 29, 1940.   J. L. GILMORE   2,219,955
TRAILER HITCH
Filed Sept. 25, 1939
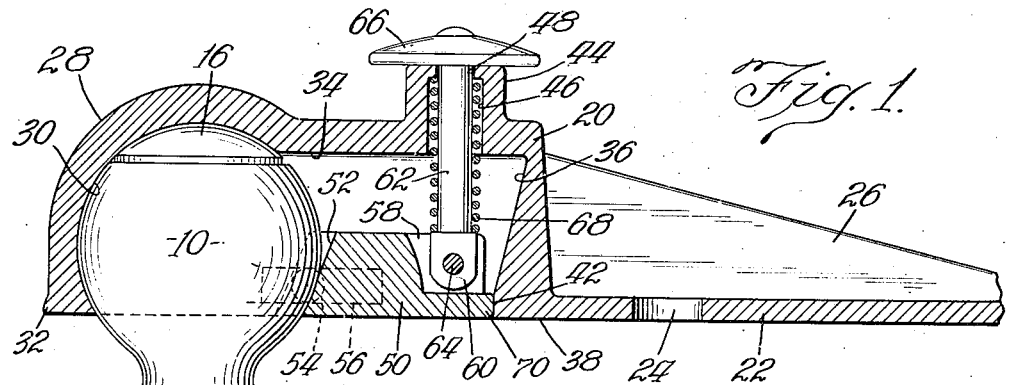
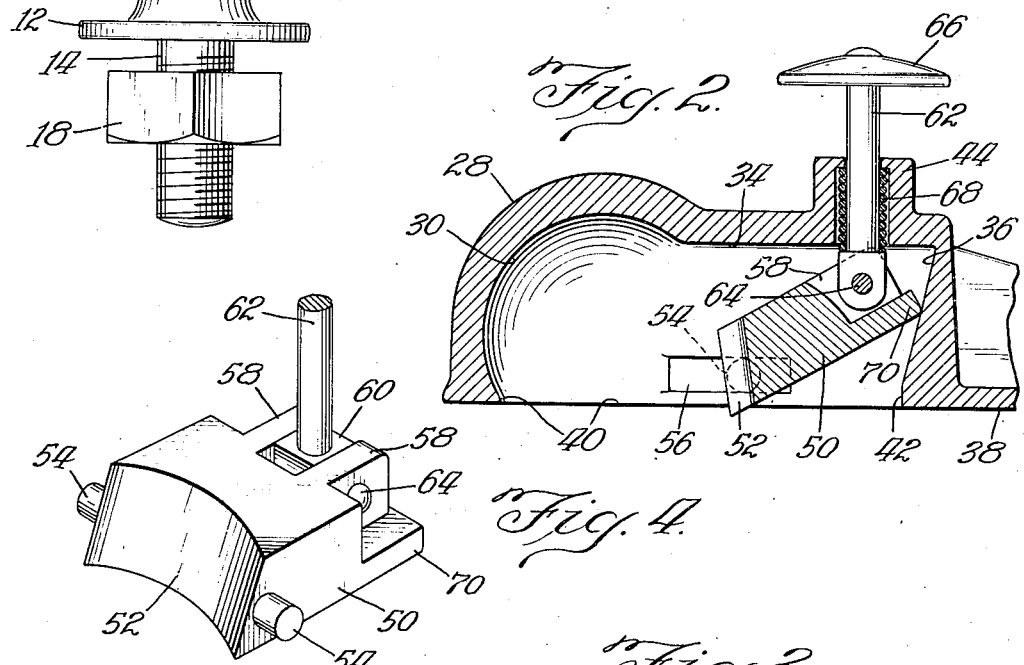
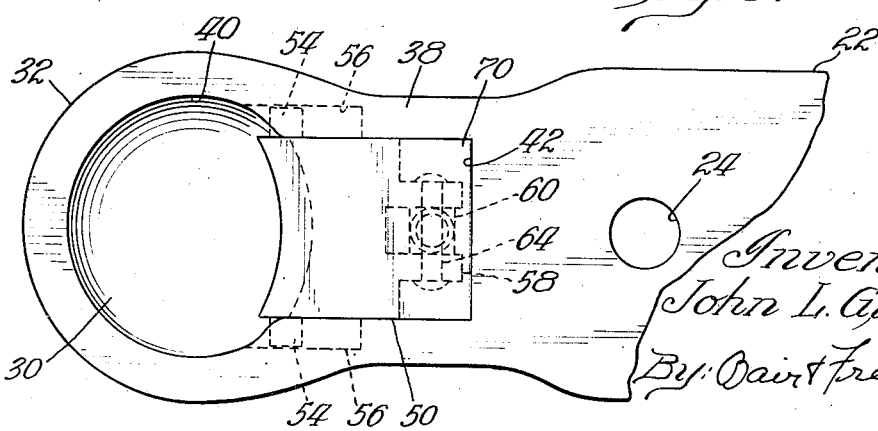
Inventor:
John L. Gilmore
By Bair & Freeman
Attys Patented Oct. 29, 1940

2,219,955

UNITED STATES PATENT OFFICE 2,219,955

TRAILER HITCH

John L. Gilmore, Kansas City, Mo.

Application September 25, 1939, Serial No. 296,465

9 Claims. (Cl. 280—33.17)

My invention relates to trailer hitches and particularly to hitches which are used ordinarily to attach a trailer to an automobile.

Among the objects of my invention is the provision of a new and improved trailer hitch of simple construction and relatively inexpensive to manufacture.

Another object of my invention is the provision of a new and improved trailer hitch which is semi-automatic in action so that, once a trailer has been coupled by means of the hitch, there will be no danger of it becoming uncoupled without the hitch being manually disengaged.

Still another object of my invention is the provision of a new and improved semi-automatic trailer hitch which cannot be coupled without the exercise of some positive manual act such as opening a portion of the coupling to receive another portion in coupled relationship, but in which when once the parts are engaged in coupling relationship they are automatically locked in place so that they cannot become inadvertently separated.

A further object of my invention is the provision of a trailer hitch in which is incorporated a resilient member acting with a locking block in such a manner that when the coupling parts are engaged in coupling relationship the locking device will be so locked in place as to form a positive retaining means which cannot be separated by any manipulation of the coupling members themselves.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a longitudinal elevational view of the parts of the trailer hitch in coupled relation.

Figure 2 is a fragmentary longitudinal section showing one of the coupling members in a position to receive the other.

Figure 3 is a fragmentary bottom view of the coupling member illustrated in Figure 2; and Figure 4 is a perspective view of the locking device alone.

In providing trailer hitches, which find a wide use in attaching ordinary domestic trailers or trailers of the kind frequently used by campers to their automobiles, it is highly desirable to have a hitch constructed in such a design that it will minimize accidents due to carelessness. While this is especially desirable for use with domestic trailers, it also finds a ready commercial application. It is often true, further, that the space between an automobile and an attached trailer is sometimes rather narrow and for that reason inaccessible, so that when a trailer is hitched to an automobile the coupling parts are frequently not securely coupled together, due not only to carelessness but to an inability of the operator to satisfactorily manipulate the device. Under other circumstances, the coupling parts might be put together in the dark and for this reason are not properly locked so that when the automobile is started down the road the parts become disengaged, permitting the trailer to run off and become seriously damaged. In the design of this coupling the parts are made such that it will be impossible to draw the trailer by means of the automobile unless the coupling parts are suitably engaged and locked in place.

In the modification chosen to illustrate my invention, there is shown a male coupling member comprising a ball 10 having a lower flange 12 and pierced by a bolt 14 threaded at the lower end and having a curved head 16. The bolt is designed to be attached to one of the vehicles to be coupled together and held in place there by means of a nut 18.

A shell 20 comprises the other coupling member, which includes a yoke 22 having bolt holes 23 for securing it to the other vehicle, and a stiffening flange 26. At the opposite end of the shell there is provided a rounded portion 28 having a rounded recess or socket 30 forming the female portion of the coupling member adapted to receive the ball 10. A stiffening rib 32 is provided at the lower end to give added strength to the shell at a point where considerable strain is present.

Likewise in the shell there is provided an intermediate recess 34 extending from the socket 30 rearwardly of the shell and terminating in a rear wall 36. The shell has a bottom face 38 in which is an opening 40 giving access to the socket 30 and recess 34. At the rear of the opening 40 is a straight wall 42 substantially perpendicular to the plane of the bottom, and the inner edge of the perpendicular wall joins the rear wall 36 of the recess at an obtuse angle, so that the wall is inclined slightly inwardly. At the top of the shell is a boss 44 provided with a pocket 46 and a passage 48 gives access to the pocket from the top of the boss.

A block 50, commonly termed a locking block, is provided for holding the ball in the shell in coupled relationship with it. This block may be made substantially flat in section with a rounded forward face 52 adapted to engage the curved surface of the ball when in locked or coupled position, and a rear abutting portion 70. At the sides of the block there are provided a pair of pivots 54 on the same axis and these, in turn, are adapted to fit into slots or guide-ways 56 in such a manner that the pivots can slide within the slots in a horizontal direction. At the rear of the block there is provided a bifurcated portion having legs 58 forming a space therebetween, and in the space is swingably mounted a head 60 for an actuating rod 62, the head being held in place by a pin 64. The rod in turn extends in a substantially vertical direction upward, as shown in Figures 1, 2 and 4, from the pocket 46 through the passage 48, so that the other end of the rod extends above the shell. A knob 66 is secured to the top of the rod for manipulating it and also for preventing it from being pushed downward out of place. In a position surrounding the rod is a coiled spring 68 with one end of the spring bearing against a shoulder in the bottom of the pocket 46 and the other end bearing against the legs 58 of the block.

In operation, when the parts of the shell and locking device occupy the normal position shown in Figure 1, the operator grasps a knob 66 and pulls it upward. This movement causes compression of the spring 68 and at the same time draws the rear end of the block 50 in an upward direction more or less in line with the longitudinal axis of the rod. The action upon the block causes the rear end 70 to move upwardly and causes the pivots 54 to slide toward the rear of the slot 56. In consequence the forward face 52 of the block is withdrawn away from the front edge of the socket 30 a distance greater than the diameter of the ball 10.

The ball 10 can then be inserted into the socket and when this is done the operator merely releases the knob 66 whereupon the spring 68 forces the rear end of the block downwardly. As the rear of the block slides down the wall 36 the pivot 54 is caused to slide forward in the slots 56 and bring the forward end 52 of the block into contact with the ball 10 at a point slightly below the middle. The spring 68 continues to shift the rear end of the block downwardly until a rear portion 70 slides into position against the vertical wall 42 of the opening 40. When once in position against this wall, the block 50 cannot be moved in a horizontal direction. When released, of course, the rear end is moved in a vertical direction and as soon as it passes a junction of the vertical wall 42 with the oblique wall 36 the projection 70 can shift slightly backwards, permitting the block to move freely.

On the contrary, if an operator attempts to couple the hitch without withdrawing the knob 66, there will of course be no retraction of the block 50 from the position shown in Figure 1. Therefore, when the ball is attempted to be inserted into the socket, the opening 40 will not be large enough, and no amount of forcing will drive the block 50 horizontally rearward in order to permit the socket to receive the ball. Therefore, coupling the parts becomes impossible unless the block is properly withdrawn and if this is done the spring will automatically lock the parts together as soon as the operator releases his hand.

There has thus been provided a trailer hitch of very simple design, having relatively few parts but so constructed that it will always act positively to hold the coupling members in place.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A trailer hitch comprising a first coupler member, a shell having a socket forming a second coupler member complementary with the first and adapted to engage the first in coupled relationship, and a retaining device adapted to alternatively maintain and release said relationship, said device having a simultaneously pivoting and sliding attachment at one end with the second coupling member and having the other end free from attachment to said second member in inoperative position, a member pivotally secured to said free end and having an endwise sliding engagement with said second member adapted to be shifted endwise to move said block between locked and unlocked positions, and resilient means for shifting said other end to a position of attachment with the socket when in operative position.

2. A trailer hitch comprising a male coupling member, a shell having a socket forming a female coupling member adapted to receive the male member in coupled relationship, and a locking device adapted to maintain said relationship including a locking block having a pivot axis at one end simultaneously pivotally and slidably mounted in the socket between the male member and a rear wall of said socket and the other end freely pivotal about said axis, a member attached to the block projecting outside the shell and a resilient element positioned between the other end of the block and the inside wall of the socket normally urging said block pivotally about the pivot axis into locked position.

3. A trailer hitch comprising a male coupling member, a shell having a socket forming a female coupling member adapted to receive the male member in coupled relationship, and a locking device adapted to maintain said relationship including a locking block simultaneously pivotally and slidably mounted in the socket between the male member and a rear wall of said socket, a member attached to the block projecting outside the shell, a resilient element for pressing said block normally into locked position, and complementary engaging faces on the block and on the socket wall to resist horizontal movement of the block when in locked position.

4. A trailer hitch comprising a male coupling member, a shell having a socket forming a second coupling member adapted to engage the male member in coupling relation and a retaining device for holding said members in engagement, said locking device including a block adapted to engage the male member, slot means for slidably mounting the block on the second member, a rod secured to said block projecting substantially upward through the shell providing a means for manually drawing the rod upward and for drawing the attached block out of engagement with the male member, and a resilient member for normally urging the block forward into engagement relation with the male member.

5. A trailer hitch comprising a male coupling member, a shell having a socket forming a second coupling member adapted to engage the male member in coupling relation and a retaining device for holding said members in engagement, said retaining device including a block adapted to engage the male member at one end and to engage a wall of said socket opposite the male member at the other end when the retaining means is in coupled position, the second member having a pair of horizontal slots positioned with their longitudinal axes below the center of the male coupling member and said block being slidably positioned in said pair of horizontal slots so that the line of thrust between said block with the male member always falls at a point substantially below the center thereof, a rod secured to the rear end of said block projecting through the shell providing means for manually withdrawing the rod and for moving the attached block rearwardly out of engagement with the male member, and a resilient member for normally urging the block into engaged relation between the male member and said opposite socket wall.

6. A trailer hitch comprising a male coupling member having a rounded shape, a shell having a socket forming a second coupling member adapted to engage the male member in coupling relation and a locking device for holding said members in engagement, said locking device including a block rounded at the forward end for engagement with the male member, a pair of pivots and a pair of horizontal slots positioned within the socket with their longitudinal axes below the center of the socket for slidably positioning said pivots so that the engagement of said block with the male member falls at a point below the center thereof, a rod secured to said block at a point below the center of said socket projecting vertically through the shell providing means for manually drawing the rod substantially upward and pivotally withdrawing and rotating the attached block rearwardly out of engagement with the male member, and a resilient member for normally urging the block pivotally and slidably forward into engaged relation with the male member.

7. A trailer hitch comprising a male coupling member having a rounded shape, a shell having a socket forming a second coupling member adapted to engage the male member in coupling relation and a locking device for holding said members in engagement, said locking device including a block shaped at the forward end for engagement with the male member, a pair of pivots and a pair of horizontal slots within the socket for slidably positioning said pivots so that the engagement of said block with the male member falls at a point below the center thereof, a rod having a movable connection with the rearward portion of said block projecting substantially upward through the shell providing means for manually withdrawing the rod and shifting the attached block with a combined pivotal and sliding movement rearwardly out of engagement with the male member, and a resilient member for normally urging the block pivotally and slidably forward into engaged relation with the male member.

8. A trailer hitch comprising a male coupling member having a rounded shape, a shell having a socket forming a second coupling member adapted to engage the male member in coupling relation and a locking device for holding said members in engagement, said locking device including a locking block rounded at the forward end for engagement with the male member, a pair of pivots rearward of the forward end, a pair of horizontal slots within the socket for slidably positioning said pivots so that the engagement of said block with the male member falls at a point below the center thereof, a rod swingably secured to the block rearwardly of the pivot pins projecting vertically upward through the shell providing means for manually withdrawing the rod and the attached block with a combined pivotal and sliding movement rearwardly out of engagement with the male member, a coiled spring about said rod for normally urging the block pivotally and slidably forward into engaged relation with the male member, an abutting portion at the rear of said block and a corresponding abutting portion at the rear of said socket for restricting horizontal movement of the block when in engagement with the male coupling member.

9. A trailer hitch comprising a shell having a socket for reception of a male coupling member, a locking block in the socket adjacent the socket opening when in operative position for holding the male member in coupled relationship, said block having at one end a simultaneously pivotal and slidable connection with the shell permitting the shifting of said end into and out of operative position and at the other end a free sliding contact with the end wall of the socket opposite the portion thereof adapted to receive said male member, a shaft extending through a wall of the shell having an end thereof pivotally connected to said other end of the block, a recessed portion extending inwardly of the shell relative to the block adapted to receive said other end of the block when in inoperative position, said end wall of the socket providing a contact face for guiding said other end of the block when being shifted between operative and inoperative positions.

JOHN L. GILMORE.